US012320510B2

(12) United States Patent
Mock et al.

(10) Patent No.: US 12,320,510 B2
(45) **Date of Patent: *Jun. 3, 2025**

(54) ELECTRONIC DEVICE FOR USE WITH DETERRENT DEVICE

(71) Applicant: Crosman Corporation, Bloomfield, NY (US)

(72) Inventors: Jeffrey W. Mock, Rochester, NY (US); John A. Kowalczyk, Jr., Fairport, NY (US)

(73) Assignee: Crosman Corporation, Bloomfield, NY (US)

( * ) Notice: Subject to any disclaimer, the term of this patent is extended or adjusted under 35 U.S.C. 154(b) by 102 days.

This patent is subject to a terminal disclaimer.

(21) Appl. No.: 17/967,769

(22) Filed: Oct. 17, 2022

(65) Prior Publication Data

US 2023/0184512 A1 Jun. 15, 2023

Related U.S. Application Data

(63) Continuation of application No. 16/102,119, filed on Aug. 13, 2018, now Pat. No. 11,473,763, which is a (Continued)

(51) Int. Cl.

*F41G 1/35* (2006.01)
*F21L 4/00* (2006.01)
(Continued)

(52) U.S. Cl.

CPC .............. *F21V 23/003* (2013.01); *F21L 4/00* (2013.01); *F21V 15/01* (2013.01); *F21V 21/34* (2013.01);
(Continued)

(58) Field of Classification Search

CPC ..... F41G 11/003; F41G 1/35; F21W 2131/40; F21V 21/34; F21V 15/01; F21V 23/003; F21L 14/00
(Continued)

(56) References Cited

U.S. PATENT DOCUMENTS

| | | |
|---|---|---|
| 541,981 A | 7/1895 | McMahon |
| 579,416 A | 3/1897 | Wagner |

(Continued)

OTHER PUBLICATIONS

Notice of Allowance U.S. Appl. No. 15/279,841, Apr. 10, 2018; Parent case of U.S. Appl. No. 16/102,119 ( Year: 2018).
(Continued)

*Primary Examiner* — John Cooper
(74) *Attorney, Agent, or Firm* — Lee & Hayes, P.C.

(57) ABSTRACT

Electronic devices for use with deterrent devices are provided. In one aspect the electronic device has a housing, a finger engagement surface shaped to receive a portion of a finger and formed in part by a first contact member movably associated with the housing and in part by a second contact member movably associated with the housing and a control system that determines an output of the electronic device by sensing a movement of at least one of the first contact member and the second contact member. The first contact member, the second contact member and the finger engagement surface are configured so that the portion of the finger received by the finger engagement surface can be urged against a first part of the finger engagement surface to move the first contact member in a manner that can be sensed, can be urged against a second part of the finger engagement surface to move the second contact member in a manner that can be sensed, and can be urged against a third portion of the finger engagement surface to move both the first contact member and the second contact member in a manner that can be sensed.

7 Claims, 13 Drawing Sheets

Related U.S. Application Data continuation of application No. 15/279,841, filed on Sep. 29, 2016, now Pat. No. 10,047,941.

(51) Int. Cl.

| | |
|---|---|
| ***F21V 15/01*** | (2006.01) |
| ***F21V 21/34*** | (2006.01) |
| ***F21V 23/00*** | (2015.01) |
| *F21W 131/40* | (2006.01) |
| *F41G 11/00* | (2006.01) |

(52) U.S. Cl.
CPC .......... *F41G 1/35* (2013.01); *F21W 2131/40* (2013.01); *F41G 11/003* (2013.01)

(58) Field of Classification Search
USPC .......................................................... 42/117
See application file for complete search history.

(56) References Cited

U.S. PATENT DOCUMENTS

| | | | |
|---|---|---|---|
| D506,486 S | 6/2005 | Kuo | |
| D547,780 S | 7/2007 | Meinzer | |
| 7,264,369 B1 | 9/2007 | Howe | |
| 7,325,352 B2 | 2/2008 | Matthews | |
| D568,508 S | 5/2008 | Howe | |
| D570,018 S | 5/2008 | Ciccone, Jr. | |
| D578,599 S | 10/2008 | Cheng | |
| D586,874 S | 2/2009 | Moody | |
| D612,756 S | 3/2010 | D'Amelio | |
| D616,956 S | 6/2010 | Hamilton | |
| D628,323 S | 11/2010 | Matthews | |
| D641,826 S | 7/2011 | Larsson | |
| D647,159 S | 10/2011 | Kobayashi | |
| D651,628 S | 1/2012 | Wang | |
| 8,109,032 B2 | 2/2012 | Faifer | |
| 8,322,066 B2 | 12/2012 | Westra | |
| D674,858 S | 1/2013 | Galli | |
| D675,281 S | 1/2013 | Speroni | |
| D679,304 S | 4/2013 | Delaney | |
| D679,775 S | 4/2013 | Cheng | |
| D682,977 S | 5/2013 | Thummel | |
| 8,490,313 B2 | 7/2013 | Frascati | |
| D693,867 S | 11/2013 | Radau | |
| 8,578,647 B2 | 11/2013 | Storch | |
| D696,377 S | 12/2013 | Thummel | |
| D701,279 S | 3/2014 | Clark | |
| 8,683,731 B2 | 4/2014 | Kowlaczyk | |
| D704,297 S | 5/2014 | Cheng | |
| D712,001 S | 8/2014 | Wells | |
| D729,339 S | 5/2015 | Chavez | |
| D732,134 S | 6/2015 | Wells | |
| 9,062,933 B1 | 6/2015 | Allen et al. | |
| D737,399 S | 8/2015 | Cheng | |
| D738,455 S | 9/2015 | Homem de Mello Anderson | |
| D746,405 S | 12/2015 | Nemeyer | |
| D749,689 S | 2/2016 | Cheng | |
| D750,685 S | 3/2016 | Santos | |
| D752,266 S | 3/2016 | Dall | |
| D757,886 S | 5/2016 | Cheng | |
| D762,806 S | 8/2016 | Chavez | |
| D763,399 S | 8/2016 | Anderson | |
| D779,981 S | 2/2017 | Kobayashi | |
| D781,983 S | 3/2017 | Wells | |
| 10,030,939 B2 * | 7/2018 | Kowalczyk, Jr. | F41G 11/003 |
| D826,363 S * | 8/2018 | Kowalczyk, Jr. | D22/109 |
| 10,047,941 B2 * | 8/2018 | Mock | F21V 15/01 |
| D830,491 S * | 10/2018 | Mock | D22/109 |
| 10,871,349 B2 * | 12/2020 | Kowalczyk | F41C 27/00 |
| 11,473,763 B2 * | 10/2022 | Mock | F41G 1/35 |
| 11,543,210 B2 * | 1/2023 | Mock | F41G 1/35 |
| 2005/0019079 A1 | 1/2005 | Griffin et al. | |
| 2005/0246937 A1 | 11/2005 | Kim | |
| 2006/0052145 A1 * | 3/2006 | Go | G06F 3/0219 455/566 |
| 2006/0196099 A1 | 9/2006 | Matthews | |
| 2007/0074443 A1 | 4/2007 | La France | |
| 2007/0113462 A1 | 5/2007 | Ho | |
| 2007/0180752 A1 | 8/2007 | Houde-Walter | |
| 2007/0227056 A1 | 10/2007 | Howe et al. | |
| 2007/0277422 A1 | 12/2007 | Ding | |
| 2008/0014995 A1 | 1/2008 | Noba | |
| 2008/0202010 A1 | 8/2008 | Matthews | |
| 2010/0229450 A1 | 9/2010 | Becker | |
| 2011/0162251 A1 | 7/2011 | Houde-Walter | |
| 2011/0185619 A1 | 8/2011 | Finnegan | |
| 2012/0124885 A1 | 5/2012 | Caulk | |
| 2012/0206799 A1 | 8/2012 | Riley | |
| 2014/0176934 A1 | 6/2014 | Perger | |
| 2015/0241169 A1 | 8/2015 | Cheng | |
| 2017/0268849 A1 | 9/2017 | Conner et al. | |
| 2019/0301833 A1 | 10/2019 | Campbell | |

OTHER PUBLICATIONS

Office Action for U.S. Appl. No. 16/102,119, malled on Feb. 19, 2021, Mock, "Electronic Device for Use With Deterrent Device", 15 Pages.
Office Action for U.S. Appl. No. 16/102,119, mailed on Jul. 8, 2021, Mock, "Electronic Device for Use With Deterrent Device", 16 Pages.
Office Action for U.S. Appl. No. 16/102,119, mailed on Aug. 5, 2020, Mock, "Electronic Device for Use With Deterrent Device", 9 Pages.
Office Action for U.S. Appl. No. 16/102,119, malled on Dec. 6, 2021, Mock, Electronic Device for Use With Deterrent Device, 23 pages.
Office Action for U.S. Appl. No. 16/102,119, mailed on Mar. 17, 2022, Mock, "Electronic Device for Use With Deterrent Device", 10 Pages.
4Thpoint, Scout Concept and Jeff Cooper, posted at the Firing Line Forums, posting date Feb. 23, 2014. [ online ], [site visited Sep. 23, 2016]. Available from Internet, <URL:https://thefiringline. com/forums/showthread.php?t=541981>.
Better Shooting Begins with the LaserMax Spartan Series, YouTube. com, fmgpubs, Published on Dec. 1, 2016, [online], [site visited Jun. 9, 2017]. URL: https: //www. youtube.com/watch?v= xSAc0FHRNr1.
Bravo Airsoft P10 Flashlight and Red Laser FDE, Airsoft 2-in-1 Laser & Flashlight Combo, <http://www.airsplat.com/ac-laser-light> ret. Jan. 8, 2016.
Crimson Trace Corporation; Crimson Trace Rail Master Pro CMR 204 & CMR-205 installation guide; PDF last modified on Dec. 9, 2015; Crimson Trace Corporation; Wilsonville, OR.
G & A Online Editors; Guns & Ammo magazine. First Look: Crimson Trace Rail Master Pro, Jan. 22, 2014, ret. Mar. 19, 2016.
Inforce APL white/IR model LED auto pistol light, 200 lumens.
Lucid C3 Rail Mounted LED Weapons Light, 300 Lumens L-C3 Light w/Free Shipping and handling, OpticsPlanets.com [online], [site visited Jun . 9, 2017]. URL: http:/ /www.opticsplanet. com/lucid-c3-rail-mounted-led-weapons-light-300-lumens.html. [site visited Jun. 9, 2017]. URL: http:/ /www.thefirearmblog.com/blog/2016/10/07/lasermax-spartan/.
Arbogast McMunn, Lasermax Picatinny Mounted Red Laser Review, posted at YouTube, posting date Apr. 16, 2014. [online], [site visited Sep. 23, 2016]. Available from Internet, <URL: https:/www.youtube. com/watch?=8ud_d3khwWw>.
Notice of Allowance U.S. Appl. No. 16/102,119; dated Apr. 10, 2018; parent case of U.S. Appl. No. 16/102,119 (Year: 2018).
Office Action for U.S. Appl. No. 29/590,068, dated Jan. 6, 2017, John A. Kowalczyk, Jr. et al., Rail Mounted Light Source, 8 pages.
Office Action for U.S. Appl. No. 16/102,119, mailed on Dec. 6, 2021, Mock, "Electronic Device for Use With Deterrent Device", 23 pages.
Office Action for U.S. Appl. No. 15/222,718, dated May 25, 2017, John A. Kowalczyk, Jr., "Adjustable Rail Mounting System", 7pages.
Office Action for U.S. Appl. No. 29/579,330, dated Jun. 27, 2017, Jeffrey W. Mock, et al., "Electronic Device for Use With Deterrent Device", 5 pages.

(56) References Cited

OTHER PUBLICATIONS

Osram Mint LED LUW CQAR (EQ white) from Oslon Square Datasheet, Version 1.5 in Osram Opto Semiconductors, Dec. 17, 2015.
Ruger SR22 22LR Rimfire Pistol with Crimson Trace Laser, posted at Sportsman's Outdoor Superstore, comment posting date Apr. 30, 2015. [online], [site visited Sep. 23, 2016]. Available from Internet, <URL: http://www.sportsmansoutdoorsuperstore.com/products2.cfm/ID/116008/ 3601/ruger-sr221r-rimfire-pistol-with-crimson-trace-laser>.
Sig Sauer Sig Tacs, STL 900-WLL Pistol Light/Laser Combo/ELK County Ammo and Arms. <http://www.ammoandarmsstore.com/shop/gun-sights/sig-sauer-sigtac-st1900-wll-pistol-lightlaser combo/#prettyPhotoret> Jan. 8, 2016.
Steiner Optics, Tactical pistol laser/light technical manual, DBALPL, visible laser pointer, white light LED 400 lumens/IR laser red illuminator.
Steiner Optics, DBAL-12 Dual Beam Aiming Laser Intelligent, http://www.steiner-optics.com/laser-devices/dbal-12#.
Surefire XC1 Compact Pistol Weapon Light LED with 1 AAA Battery Aluminum Black, MidwayUSA.com, [online], [site visited Jun. 9, 2017]. URL: https://www.midwayusa.com/product/579416/surfire-xcl-compact-pistol-weapon-light-led-with-1-aaa-battery-aluminum-black.
UTG Sub Compact LED Light Laser Combo, Airsoft 2-in-1 Laser & Flashlight Combo-Laser, Light, Scope & Scope Mounts. <http://www.airsplat.com/ac-up/ac-laser-light> Ret. Jan. 8, 2016.
Wood, "The Best Home Defense Lasers at Every Prices Point" posted at Guns & Ammo, posting date: Dec. 22, 2013 [online], [cite visited Sep. 23, 2016]. Available from Internet <URL:http://www.gunsandammo.com/optics/best-home-defense-lasers_at_every_price/>.

* cited by examiner

ELECTRONIC DEVICE FOR USE WITH DETERRENT DEVICE

RELATED APPLICATIONS

This application is a continuation of and claims priority to U.S. patent application Ser. No. 16/102,119 filed on Aug. 13, 2018, titled "ELECTRONIC DEVICE FOR USE WITH DETERRENT DEVICE," which is a continuation of U.S. patent application Ser. No. 15/279,841 filed on Sep. 29, 2016, titled "ELECTRONIC DEVICE FOR USE WITH DETERRENT DEVICE," now patented as U.S. Pat. No. 10,047,941, the entirety of both which are incorporated herein by reference. Cross reference is made to U.S. patent application Ser. No. 29/579,330 entitled "Electronic Device for use With Deterrent device" filed on Sep. 29, 2016, U.S. patent application Ser. No. 15/222,718 entitled "Adjustable Rail Mounting System" and filed on Jul. 28, 2016, U.S. patent application Ser. No. 29/534,285 entitled "Rail Mounted Light Source" and filed on Jul. 28, 2015, and U.S. Provisional Patent Application No. 62/197,566, entitled "Adjustable Rail Mounting System" and filed on Jul. 28, 2015 each of which is incorporated herein in their entirety by reference.

STATEMENT REGARDING FEDERALLY SPONSORED RESEARCH OR DEVELOPMENT

Not applicable.

FIELD OF THE INVENTION

The invention relates to electronic devices of the type used with firearms and other deterrent devices.

DESCRIPTION OF RELATED ART

It is increasingly common for electronic systems, such as lasers and sights that aid in aiming, viewing, and illuminating a potential target area or that otherwise provide images and information, to be associated with firearms or other types of deterrent devices. These electronic systems may be incorporated into a deterrent device or may be mounted or otherwise mechanically joined to the deterrent device after manufacture.

Providing for activation and control of deterrent device associated electronic devices can be challenging. Many deterrent devices require two hands on grip surfaces for accurate operation. Additionally, many deterrent devices have deterrent device control, access and actuation surfaces that are typically positioned so that they can be quickly and easily reached by a user with his or her hands positioned on predetermined grip surfaces. Accordingly, there can be few opportunities to provide activation surfaces for electronic devices in locations that can be conveniently accessed by hands that are also at least in part gripping the grip surfaces of the deterrent device.

Another challenge in providing activation and control surfaces for a electronic devices used in association with deterrent devices is the increasing complexity of such devices. As the cost of critical components drops and the performance of critical components increases it has become possible to provide increased functionality in electronic devices of the type used with deterrent devices. However, devices of such complexity typically demand more control surfaces than older devices.

For example, Steiner eOptics DEAL-PL Dual Beam Aiming Laser Pistol Light sold by Steiner Optics, of Greely, Colorado, USA, is an electronic device that can emit an infrared light and a laser either alone or in combination. This device offers control surfaces for the light system on one side of the device and control surfaces for the laser system on the other.

It will be appreciated that activation of such lighting combinations requires the user to make an activation action on one side of the device, while activation of both systems, if desired, would require user input actions on both sides of the device. As activation of such systems is typically performed with the device mounted to a deterrent device such as a firearm, activation of both systems requires activation actions on both sides of the firearm. While useful for many purposes, this arrangement may distract a user or cause the user release his or her grip on the firearm slightly to activate one or the other of the switches.

Alternatively, some devices such as the D-BAL-12 sold by Steiner Optics, of Greely, Colorado, USA, utilize a single dial switch with a number of settings to activate one laser system, another laser system or both. However, such a dial switch approach does not make accurate selection more likely. Such dials are often relatively small to fit onto a deterrent device mounted electronic system and a user of such a device may find it challenging to quickly activate and select a desired mode of operation.

Additionally, a user may be required to cycle through various settings to reach one that is desired and a risk exists that an undesired mode of operation may be selected while cycling to a desired mode setting or by making the error of cycling past a desired mode setting.

For these reasons, the use of a dial requires focused attention from a user of the electronic device and therefore further distracts the user from his or her surroundings.

What are needed, therefore, are deterrent device associated electronic systems having control arrangements that allow accurate selection of a mode of operation without distracting the user.

What are also needed are electronic devices for use with a deterrent device that enable accurate activation of specific functions of the electronic devices while holding or gripping a deterrent device in a manner that is consistent with handling and usage of the deterrent device.

Optionally, what are also needed are electronic devices for use with deterrent devices that can be actuated ambidextrously. Preferably, such electronic devices should also be ergonomically integrated with normal device functions and intuitive to operate.

What are also needed are deterrent devices having electronic systems that meet such needs and others described or implicit herein.

Further, there is a need for deterrent devices that incorporate electronic devices and that meet such needs and others described or implicit herein.

SUMMARY OF THE INVENTION

Electronic devices for use with deterrent devices are provided. In one aspect the electronic device has a housing, a finger engagement surface shaped to receive a portion of a finger and formed in part by a first contact member movably associated with the housing and in part by a second contact member movably associated with the housing and a control system that determines an output of the electronic device by sensing a movement of at least one of the first contact member and the second contact member. The first contact member, the second contact member and the finger engagement surface are configured so that the portion of the finger received by the finger engagement surface can be urged against a first part of the finger engagement surface to move the first contact member in a manner that can be sensed, can be urged against a second part of the finger engagement surface to move the second contact member in a manner that can be sensed, and can be urged against a third portion of the finger engagement surface to move both the first contact member and the second contact member in a manner that can be sensed.

DETAILED DESCRIPTION OF THE DRAWINGS

Figure 1:
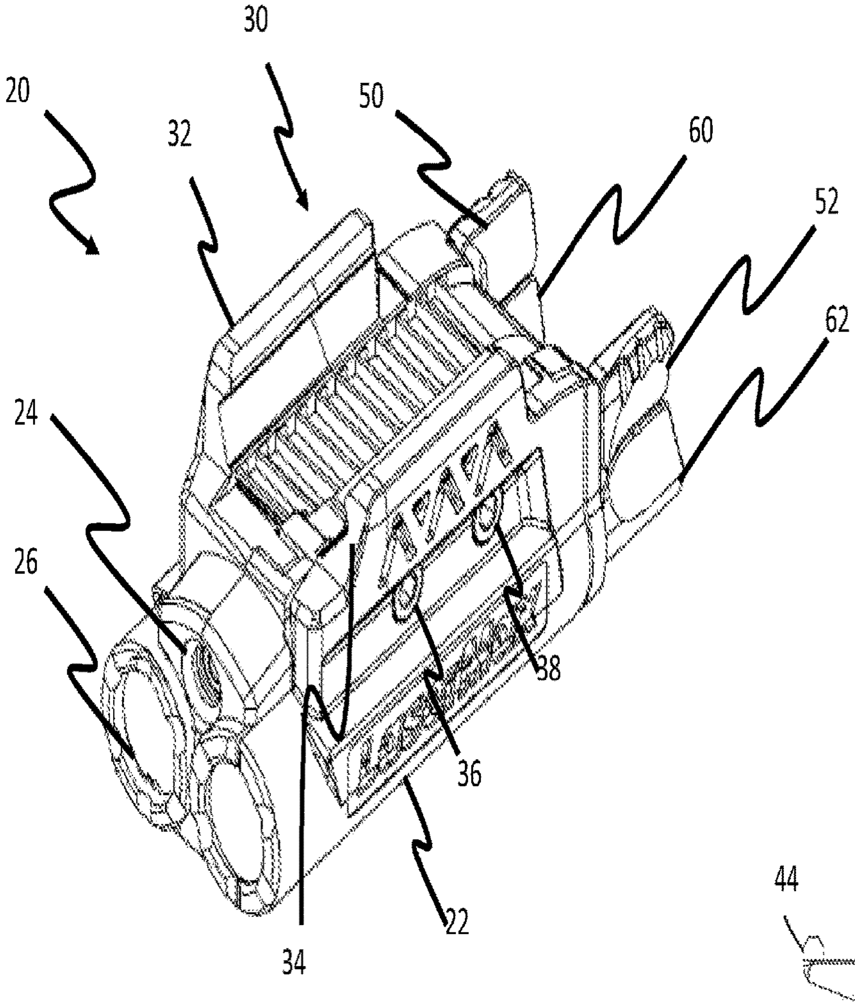
FIG. 1 is an isometric view of an electronic device for use with a deterrent device such as a firearm, dispersant, or other type of deterrent device.
Figure 3:
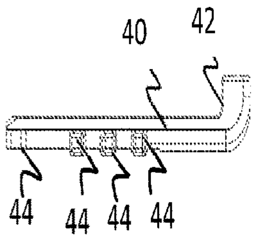
FIG. 2 and FIG. 3 respectively are top and side views of an optional rail positioner.
Figure 2:
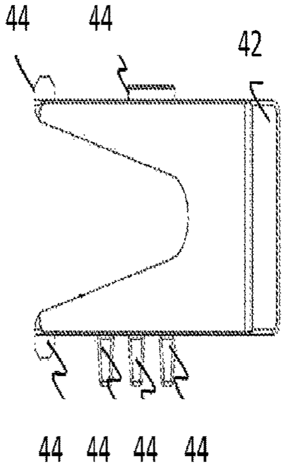
Figure 4:
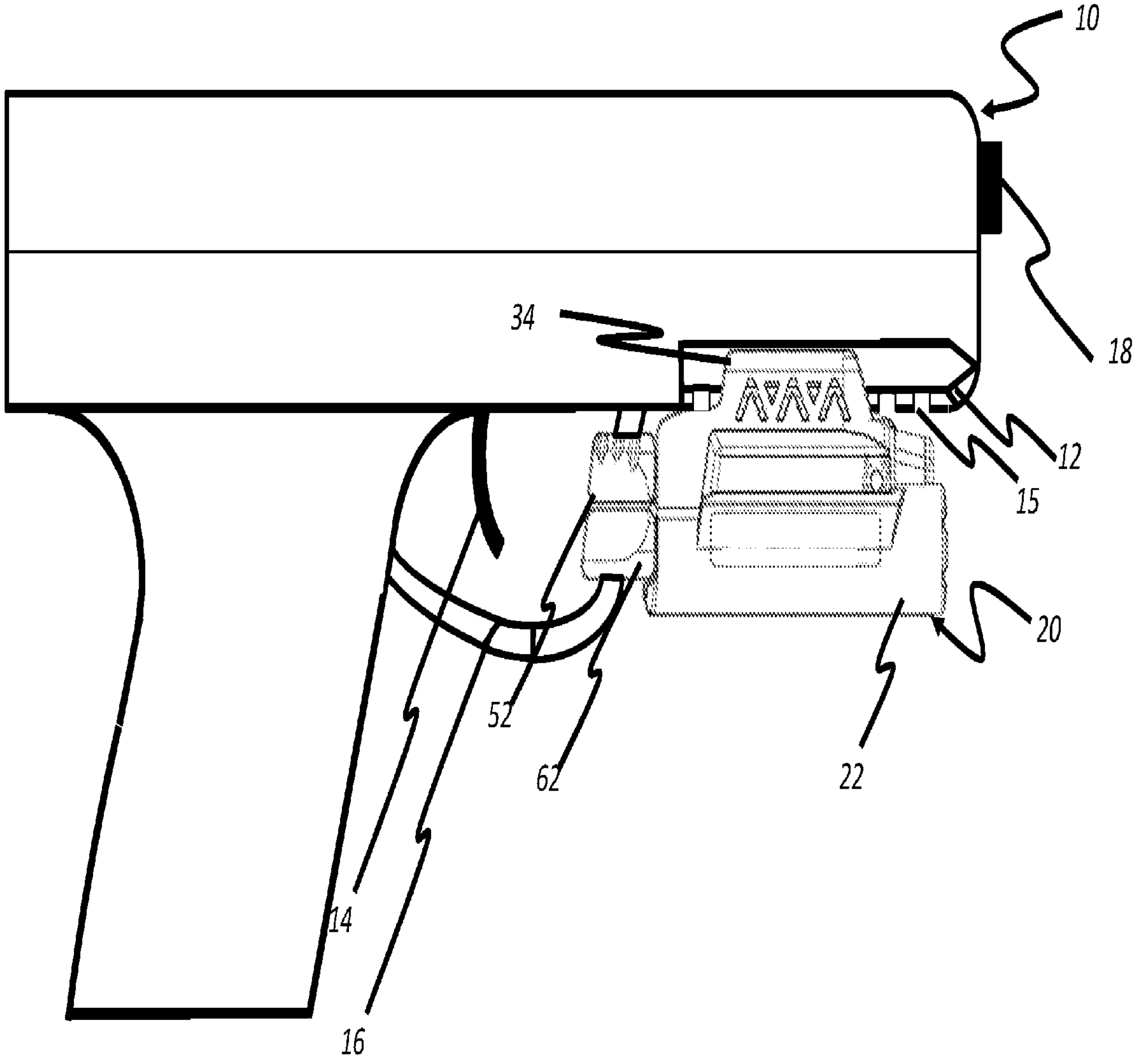
FIG. 4 is a right side elevation view of the embodiment of the electronic device shown in FIGS. 1-3 joined to one possible deterrent device.
Figure 5:
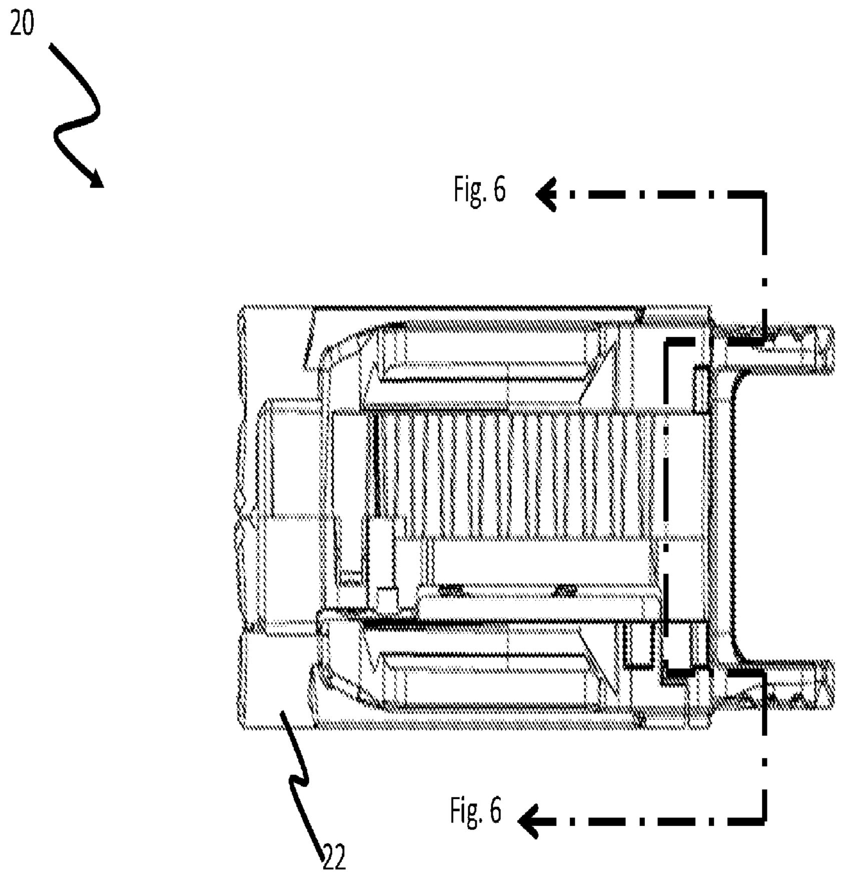
FIG. 5 is a top view of the embodiment of electronic device shown in FIG. 1 without the rail positioner in place.

FIG. 1 is a front, left, top isometric view of an electronic device 20 for use with a deterrent device 10 such as a firearm, dispersant, or other type of deterrent device. FIG. 2 and FIG. 3 respectively are top and side views of an optional rail positioner 40. FIG. 4 is a right side elevation view of the embodiment of electronic device 20 joined to one possible deterrent device 10. FIG. 5 is a top view of the embodiment of electronic device 20 shown in FIGS. 1-4.

In the embodiment of FIGS. 1-5 electronic device 20 is shown having a housing 22 with a first opening 24 allowing laser light to pass from inside housing 22 to the environment outside and a second opening 26 allowing an illuminating light to pass from inside of housing 22 to the environment outside.

Either or both of first opening 24 and second opening 26 may include windows (not shown) that protect against contaminants entering into housing 22 while allowing at least some light to pass through. Such windows may take the form of optical elements such as lenses prisms or other known forms of optical elements that allow light to pass through while also shaping redirecting focusing, filtering, coloring or diffusing such light.

Housing 22 includes a rail mount 30 having opposing rail mounting surfaces 32 and 34 that are movable relative to each other. Clamping screws 36 and 38 cooperate with housing 22 to define an extent of maximum separation between rail mounting surfaces 32 and 34. Clamping screws 36 and 38 can be loosened to increase separation between rail mounts 32 and 34 when positioning a rail 12 between rail mounting surfaces 32 and 34. The separation between rail mounting surfaces 32 and 34 can then be decreased in order to clamp rail 12 between rail mounts 32 and 34.

As is shown in FIGS. 2 and 3, an optional a rail positioner 40 can be provided. Rail positioner 40 also can be positioned at any of a range of different positions between rail mounts 32 and 34 prior to assembly of electronic device 20 to deterrent device 10. In FIGS. 2 and 3 rail positioner 40 is shown having a cross member 42 that is shaped to protrude upwardly into a recoil groove 15 that extends across a rail 12 to position housing 22 along a length of rail 12.

Rail positioner 40 can be fixed relative to rail mounts 34 by the vice-like action of closing the distance between rail mounts 32 and 34. In the embodiment illustrated rail positioner 40 is illustrated with features 44 designed to engage co-designed features of rail mounting surfaces 32 and 34 to help ensure alignment and positioning of rail positioner 40. Other mechanisms may also be used to fix a position of rail positioner 40 relative to housing 22.

In the embodiment of FIGS. 1-5 a first contact member 50 is movably associated with housing 22. In this regard, first contact member 50 can be mounted or otherwise mechanically linked to housing 22 in any other manner that enables some degree of movement between a first position and a second position relative to housing 22. Similarly, a second contact member 60 is movably associated with housing 22. In this regard, second contact member 60 can be mounted or otherwise mechanically linked to housing 22 in any other manner that enables some degree of movement between a first position and a second position relative to housing 22. In this example embodiment, first contact member 50 is arranged substantially above and generally aligned with second contact member 60 when first contact member 50 is in the first position and second contact member 60 is in the first position.

Figure 6:
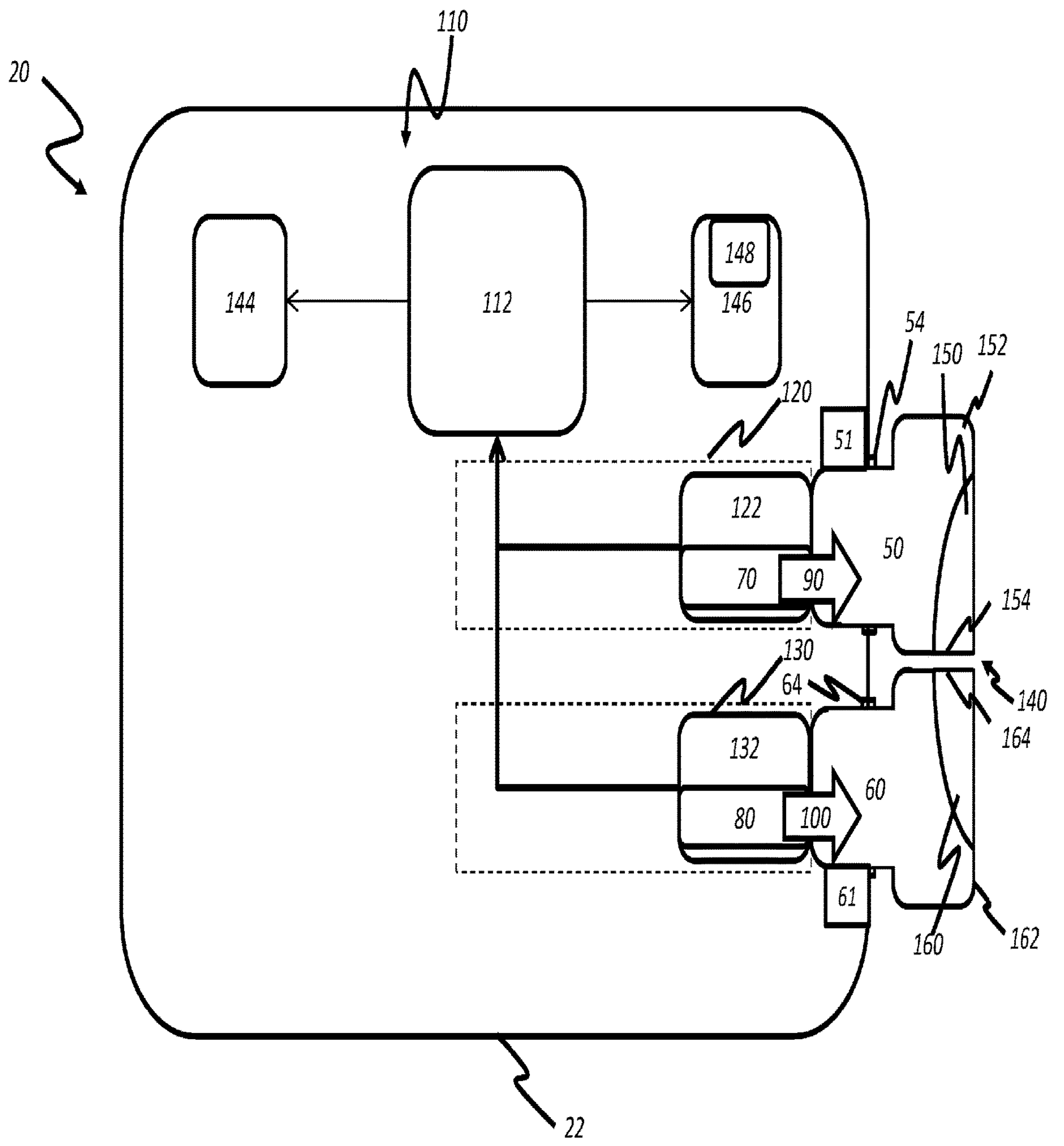
FIG. 6 is a system illustration of the electronic device of FIG. 1.

FIG. 6 is a system view of the embodiment of electronic device 20 of FIG. 1. In this embodiment, contact members 50 and 60 extend partially within openings 54 and 64 of housing 22 for sliding movement between a first position and a second position. Here, the first positions are defined by stops 51 and 61 which limit an extent to which first contact member 50 and second contact member 60 can extend from housing 22.

In embodiments, first contact member 50, second contact member 60, housing 22 or other components of electronic device 20 can be defined in other ways so that at least a portion of each of first contact member 50 and second contact member 60 is retained within housing 22 or otherwise mechanically associated with housing 22.

In the embodiment shown in FIG. 6 biasing member 70 applies a biasing force 90 that urges first contact member 50 away from an interior of housing 22 and into its first position. Similarly, biasing member 80 applies a biasing force 100 that urges second contact member 60 away from an interior of housing 22 and into its first position.

Accordingly, contact members 50 and 60 must be urged by forces greater than biasing forces 90 and 100 to cause contact members 50 and 60 to move from their respective first positions.

FIG. 6 also illustrates a control system 110 in housing 22. In this embodiment, control system 110 has a controller 112 linked to a first input sensing circuit 120 and a second input sensing circuit 130. First input sensing circuit 120 is adapted to sense when first contact member 50 is moved while second input sensing circuit 130 is adapted to sense when second contact member 60 is moved.

Control system 110 may be adapted to cause a state of operation of electronic device 20 to change when a sensor 122 of first input sensing circuit 120 senses movement of first contact surface 50. In one embodiment of this type a laser system 144 can be activated when movement of first contact surface 50 is sensed.

Control system 110 also may be adapted to cause a state of operation of electronic device 20 to change when a second sensor 132 of a second input sensing circuit 130 senses conditions indicating that second contact member 60 has been moved. For example, in one embodiment of this type an illumination system 146 having a light emitter 148 that can be activated or de-activated when movement of second contact member 60 is sensed.

Control system 110 may also be adapted to select a third mode of operation when first sensing circuit 120 senses a change of state at first sensor 122 that is indicative of movement of first contact surface 50 and when second input sensing circuit 130 senses a change of state of second sensor 132 indicative of movement of second contact member 60 at about the same time, or within a predetermined time period or in any temporal or other pattern of movement indicative of intentional movement of both first contact surface 50 and second contact surface 60.

In one example of this type, control system 110 may select a third mode of operation of electronic device 20 by activating or deactivating both laser system 144 and illumination system 146 when it is determined that first contact member 50 and second contact member 60 have been moved at the same time or within a predetermined time period or in any temporal or other pattern of movement indicative of intentional movement of both first contact surface 50 and second contact surface 60.

In another example of this type control system 110 may cause one or both of laser system 144 and illumination system 146 to enter into a special mode of operation when such conditions are detected such as where operation of both laser system 144 and illumination system 146 are operated in a particular manner that is different from the manner in which laser system 144 and illumination system 146 are operated when activated separately.

Of particular concern in the design of a an electronic device 20 that includes a light source such as a laser or light system is the challenge of providing the most effective laser power and scene illumination without unnecessary battery consumption. In this regard, control system 110 may have modes of operation intended to improve this outcome.

For example and without limitation, laser system 144 and illumination system 146 may be operated in a non-continuous mode such as by being pulsed. Such pulsing can be at any of a variety of different frequencies such as between about ⅓ of a cycle per second to about 1,000,000 cycles per second. Optionally or additionally the current applied to and consequent light intensity generated by the laser system 144 or illumination system 146 may be adjusted between a system minimum and a system maximum for example to achieve desired levels of brightness, to extend battery life, to manage thermal output or laser efficiency.

Further improvements in performance may be accomplished by the selection of a light emitter 148 that generates particular wavelengths of light. For example, it is well known that the human eye has red, green and blue color sensors and interprets colors based upon the sensed combinations of these different colors of light. However, the human eye is not equally sensitive to all such colors. In particular, the color sensors in the human eye are more sensitive to green colors than to red and blue.

It is known to use green laser illuminators such as the ND-3 Laser Designator sold by BSA Optics, Fort Lauderdale, FL, USA which generate a green illumination beam to illuminate a scene. The advantages of such illuminators include greater perceived illumination intensity per unit of energy consumed.

However, the use of green illuminators has long been associated with certain drawbacks. In particular, human visual acuity is not merely a function of sensing it is also a function of interpreting what is sensed and visual processing systems are not perfectly adapted to interpreting visual information in a single wavelength or narrow wavelength band of light as such light may interact with objects in a scene in ways that are not always intuitive to understand. For example, objects may have surfaces with glare or absorption characteristics may appear differently when exposed to narrow bandwidth illumination than when exposed to broad bandwidth illumination. Additionally, such green illuminators can be complex, expensive, and require other engineering and design tradeoffs that may not be acceptable in applications.

Further color information is another important characteristic used in interpreting visual information and color information itself may be distorted by narrow band illumination ways that are not fully appreciated by an observer.

What has been needed therefore is a new approach to scene illumination.

Accordingly in embodiments, electronic device 20, illumination system 146 may utilize a light emitter 148 that emits a light having a combination of wavelengths and intensities that are better matched both to human visual sensitivity and to visual processing.

In embodiments, light emitter 148 emits a light having a high preponderance of a green light to takes advantage of enhanced human light sensitivity in wavelengths that are perceived to be green by providing higher intensities of light in the green perceived wavelengths, while also providing at least enough light in wavelengths other than green to combine with the green light to create a "green-white" illumination of a scene. This illuminates the scene in a way that both takes advantage of the enhanced sensitivity of the human eye to green light to while still providing enough white light in the scene to preserve significant color information and avoids unnatural responses to narrow band illumination.

This can be accomplished in a variety of ways, in one example, light emitter 148 includes a generally broad band emitter and a filter system that custom filters the broadband emitted light to achieve a precise wavelength combination. In another embodiment, a combination of narrow band or single color emitters can be used in a combination that is calibrated or operated to secure a particular combination of wavelengths.

Such an approach has the advantage of being customizable and precisely tunable by a user or manufacturer of the system to provide desired combinations of wavelengths. Additionally this approach allows for the selection of combinations of emitters having high efficiencies and other characteristics that may be desirable from weight, efficiency or manufacturability criteria.

A third approach involves the use of single light emitters that are manufactured to efficiently emit light having the above described combination of wavelengths or an approximation thereof. For example the LUW CQAR (EQW) high-power LED sold by OSRAM Opto Semiconductors GmbH, Regensburg, Germany, emits light concentrated in the green perceived wavelengths, but having sufficient contributions from other wavelengths, create a white-green light of a type that provides the advantages described above.

In the above described non-filtering embodiments, intensities of at least some of any illuminating light emitted at non-green wavelengths may be lower than those of the green light and lower than would be required to fully combine with the green light to create white light. In this way such an illuminator may be able to provide levels of perceived illumination of a scene comparable to those of a white or near white light emitter but with greater efficiency than such a white or near white light illuminator.

It will be appreciated that operation of electronic device 20 requires that a user actuate a desired one or both of first contact member 50 and second contact member 60 and that the embodiments claimed and described herein enable a user can do so in an intuitive manner that requires little or no repositioning of an activating finger and that does not significantly distract a user from the management and control of the deterrent device 10.

Returning again to discussion of first contact member 50 and second contact member 60, it will be observed that a finger engagement surface 140 is formed in part by first contact member 50 and in part by second contact member 60.

Finger engagement surface 140 is shaped to receive a portion of a finger 200 positioned m part between first contact member 50 and second contact member 60. In embodiments, finger engagement surface 140 may be shaped to guide a finger positioned against finger engagement surface 140 to a position that is within predetermined range of positions relative to first contact member 50 and second contact member 60. This may be done by contouring or otherwise shaping first contact member 50 and second contact member 60 to form a finger engagement surface 140 that provides a receiving area for a finger.

As is shown in FIG. 6, first contact member 50 defines a first finger receiving surface 150 extending generally from a first ridge 152 to a first contact member edge 154 of first contact member 50 adjacent to second contact member 60. Finger receiving surface 150 defines a first part of finger engagement surface 140.

Similarly, second contact member 60 defines a second finger receiving surface 160 extending generally from a second ridge 162 to a second contact member edge 164 of second contact member 60. Second finger receiving surface 160 defines a remaining part of finger engagement surface 140.

In this embodiment, first finger receiving surface 150 and second finger receiving surface 160 are generally illustrated as being symmetrically shaped but oppositely configured curved surfaces. First finger receiving surface 150 is shown extending from an optional ridge 152 to a first contact member edge 154 while second finger receiving surface 160 is shown extending from an optional ridge 162 to a second contact member edge 164. In other embodiments, other options are possible and within the spirit of what is described herein.

Figure 7:
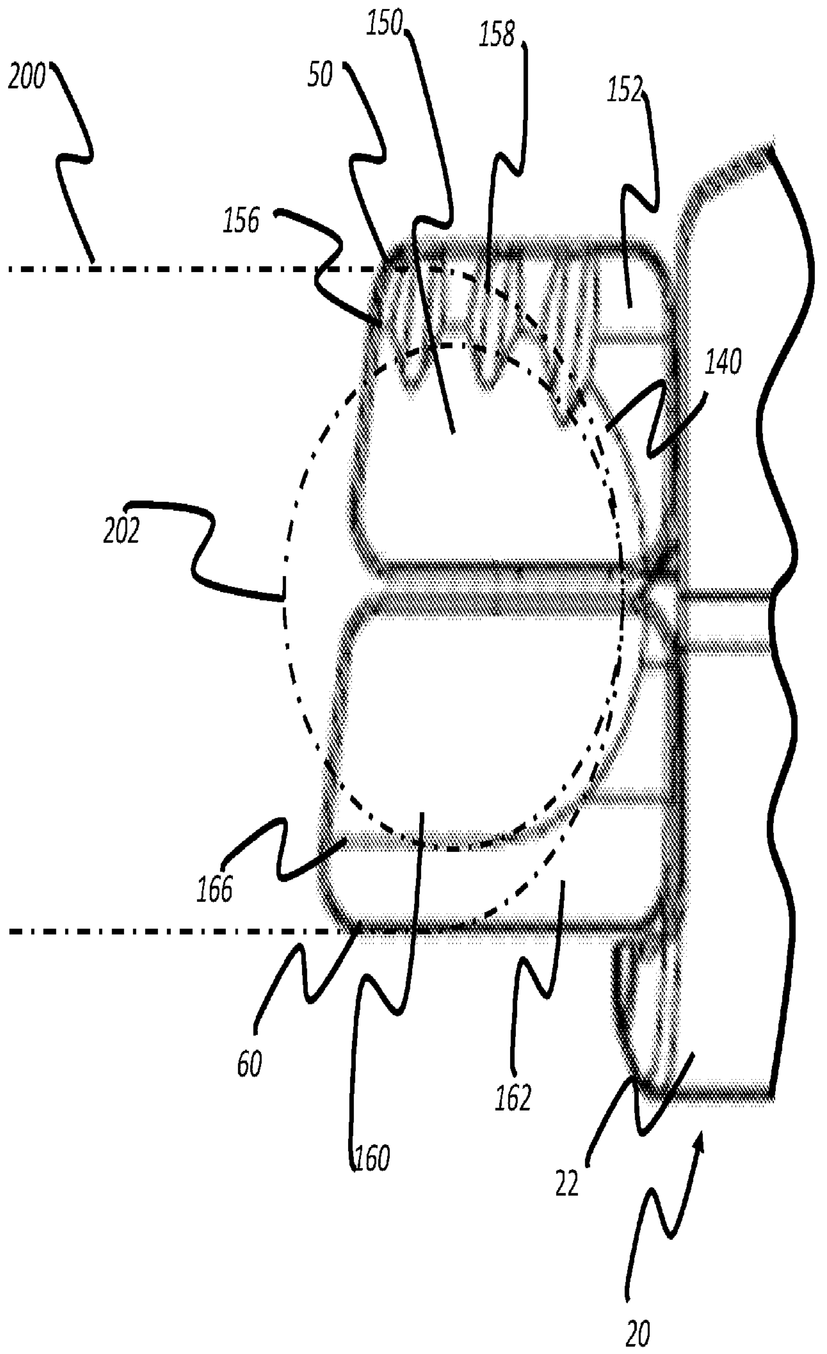
FIG. 7 is a side elevation cutaway view of the embodiment of FIG. 1 with a finger shown in phantom.
Figure 8:
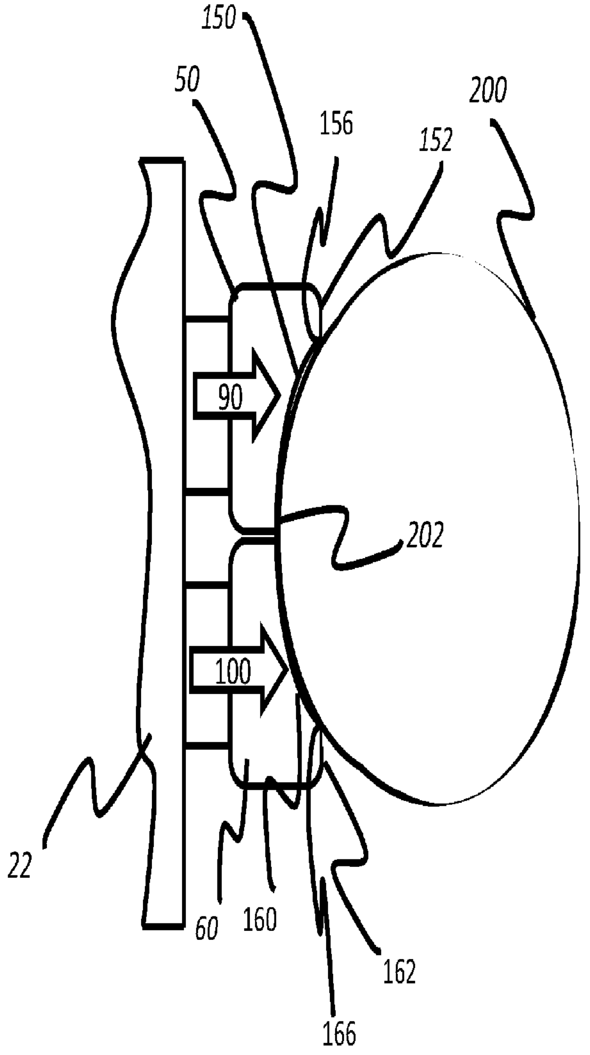
FIG. 8 illustrates a finger resting against a finger engagement surface.

FIGS. 7 and 8 illustrate respectively a right side cut away elevation view of a portion of electronic device 20 with a finger 200 and fingertip 202 shown in phantom and a system illustration of a portion of housing 22, first contact member 50 and second contact member 60 with a finger 200 positioned against finger engagement surface 140.

In FIGS. 7 and 8, finger 200 (shown in phantom in FIG. 1) is illustrated as a right hand index finger of a hand that is gripping or otherwise holding a deterrent device such as for example and without limitation, deterrent device IO shown in FIG. 1.

In one non-limiting example of this, such as the example shown in FIG. 4 electronic device 20 can be fixed to a rail 12 that is positioned between trigger guard 16 on a conventional pistol type deterrent device 10 and an end of a barrel 18 thereof. Here, a user's right hand index finger can be positioned in an off of the trigger position and into finger engagement surface 140.

In such an arrangement finger 200 may be positioned against finger engagement surface 140 in a manner that allows finger 200 to be repositioned onto trigger 14 after controlled activation of one or more of the systems of electronic device 20 if necessary.

In this embodiment, finger engagement surface 140 is shaped to receive finger 200 so as to help guide finger 200 into a range of positions well suited for pressing against one or both of first contact member 50 and second contact member 60.

Additionally, in this embodiment, finger engagement surface 140 is arranged to provide an area in which fingertip 202 can be pressed at a first level of force that does not overcome either of biasing forces 90 and 100. This allows a finger 200 to rest against finger engagement surface 140 when a user is handling the deterrent device associated with electronic device 20 without changing a state of activation of electronic device 20. This, in turn, allows finger 200 to be in a range of positions suited to either first contact member 50 or second contact member 60, or both to be pressed quickly.

Finger engagement surface 140 may be shaped to provide a user of electronic device 20 with some assistance in maintaining finger 200 in the range of positions suited for pressing against one or both of first contact member 50 and second contact member 60 when a portion of finger 200 such as fingertip 202 is positioned against or otherwise received by finger engagement surface 140. This can be done as shown here by shaping finger engagement surface 140 in a manner that follows a general shape of a fingertip 202, however in other embodiments, other shapes may be useful including but not limited to those that provide anti-slip, contaminant drainage or other contact or friction enhancing features.

Additionally, either of ridges 152 and 162 may provide a mechanical feature to help a user to hold fingertip 202 proximate to finger engagement surface 140 or to help prevent a finger 200 from unintentionally separating from finger engagement surface 140 such as during rapid movement of deterrent device 10 and electronic device 20.

Finger engagement surface 140 may include areas of significantly increased slope separating ridges 152 and 162 from finger engagement surface 140. For example, a sharp increase in slope over a distance of about 0.5 mm more between finger engagement surface 140 and ridges 152 and 162 such as along ridge edges 156 and 166 may provide sufficient separation to allow ridges 152 and 162 to help mechanically maintain finger 200 from generally vertically shaking out of finger engagement surface 140, when, for example the user is walking or running holding finger 200 against finger engagement surface 140.

Further, FIGS. 7 and 8, ridges 152 and 162 can be shaped to provide additional tactile experience that readily identifies to the user of electronic device 20 that finger 200 or a portion thereof is positioned against ridge edges 156 or 166. This can further help to alert a user that finger 200 is being urged out of finger engagement surface 140. First ridge 152 and second ridge 162 can further be shaped to provide a tactile experience that is indicative of whether a finger is pressed against one of ridges 152 and 162 so as to alert a user that a fingertip 202 is not against finger engagement surface 140.

Figure 9:
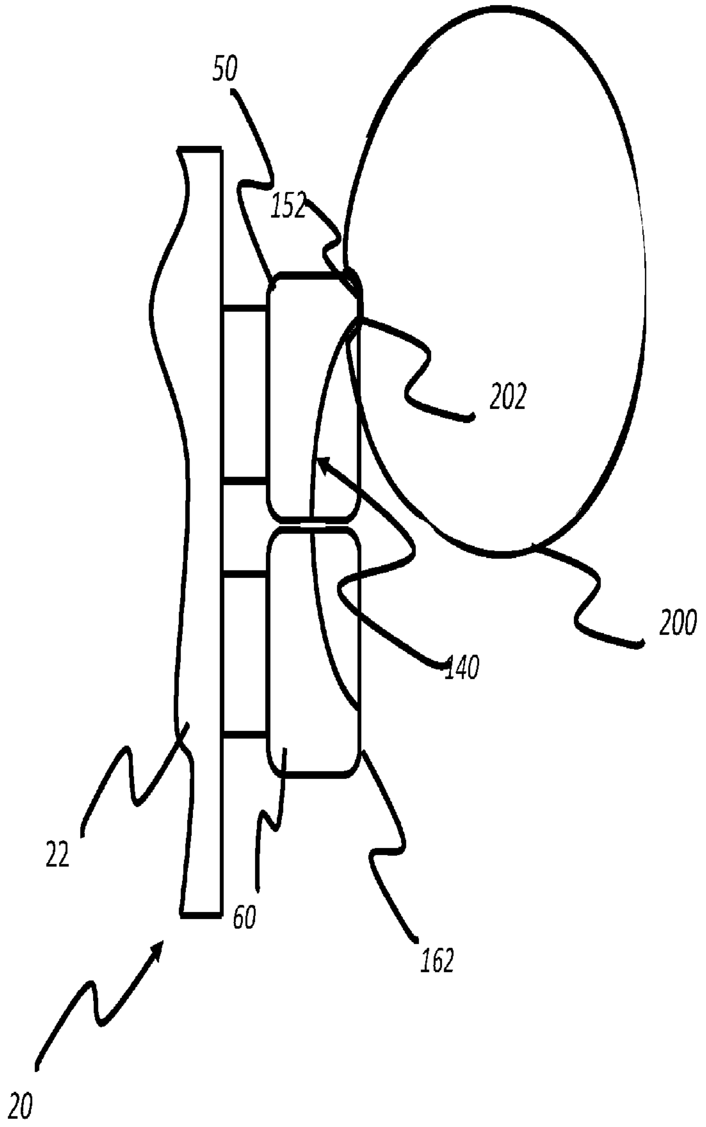
FIG. 9 illustrates a finger resting against a ridge.

For example, as is illustrated in FIG. 9, which shows another view of electronic device 20 with housing 22 cutaway, first ridge 152 provides a substantially different tactile experience at a fingertip 202 to a user who presses finger 200 against first ridge 152 than a user who presses fingertip 200 against finger engagement surface 140. This different experience indicates that the user's index finger either has not been brought in to initial contact with finger engagement surface 140 or has left contact with finger engagement surface 140. Similarly second ridge 162 provides a substantially different tactile experience against a user who presses finger 200 against second ridge 162.

Further, referring again to FIG. 7, it will be noted that first contact member 50 has a first ridge 152 with optional surface features 158 that are not found on second ridge 162. Surface features 158 are designed so that a finger pressing against first ridge 152 as illustrated in FIG. 9, will register a different tactile experience than a finger pressed against second ridge 162. In this embodiment surface features 158 are illustrated as detents in first ridge 152, however, in other embodiments other shapes can be used. In still other embodiments, second ridge 162 can have such features while first ridge 152 does not or both ridges 152 and 162 can have such surface features but with differences that are detectable. Further, as shown here, such surface features may extend into ridges edges such as first ridge edge 156 as shown or optionally section ridge 166 and optionally shown here such surface features may extend partially into a finger receiving area defined by finger engagement surface 140 such as may be provided by first finger receiving area surface 150 or second finger receiving surface 160 proximate to first ridge 156 or to second ridge 166 respectively.

In this way a user who senses that his or her finger is positioned against one of ridges 152 and 162, will also be able to determine which of ridges 152 and 162 his or her finger is positioned against. This enables a user to more confidently and to quickly make decisions as to how to move finger 200 to bring fingertip 202 into contact with finger engagement surface 140.

This arrangement also provides an opportunity for a user who wishes to move only one of first contact member 50 and second contact member 60 to determine on the basis of tactile feel that his or her finger is against first ridge 152 of first contact member 50 or second ridge 162 of second contact member 60 and to apply a force to move the desired contact member.

In this example surface features such a surface features 158 are shown taking the form of detents however, these can take other forms such as projections, or any other patterns of surface features that may be selected to create a predetermined tactile sensation in finger 200 when finger 200 is pressed against first ridge 152 or second ridge 162. Additionally or optionally, features such as surface features 158 can be positioned on any portion of first contact member 50 and second contact member 60 outside of a finger receiving area proximate finger engagement surface 140.

Figure 10:
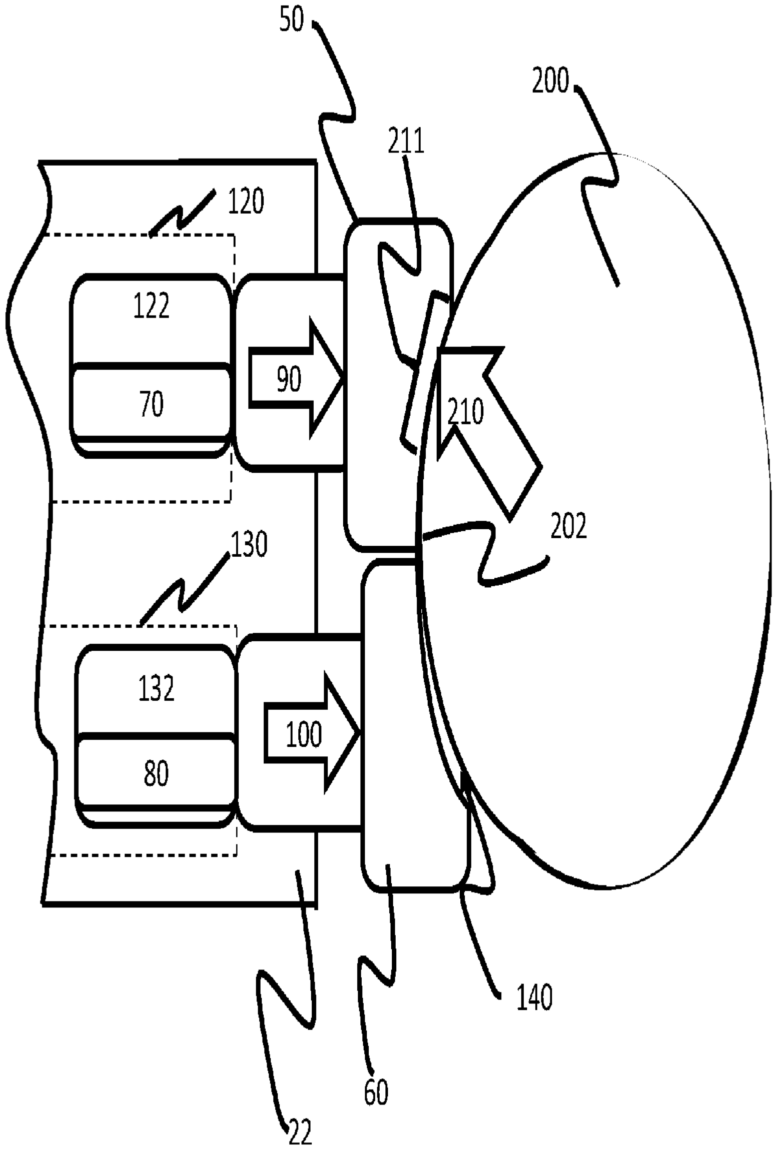
FIG. 10 illustrates a finger applying a force against a finger engagement surface to move a first engagement surface.
Figure 11:
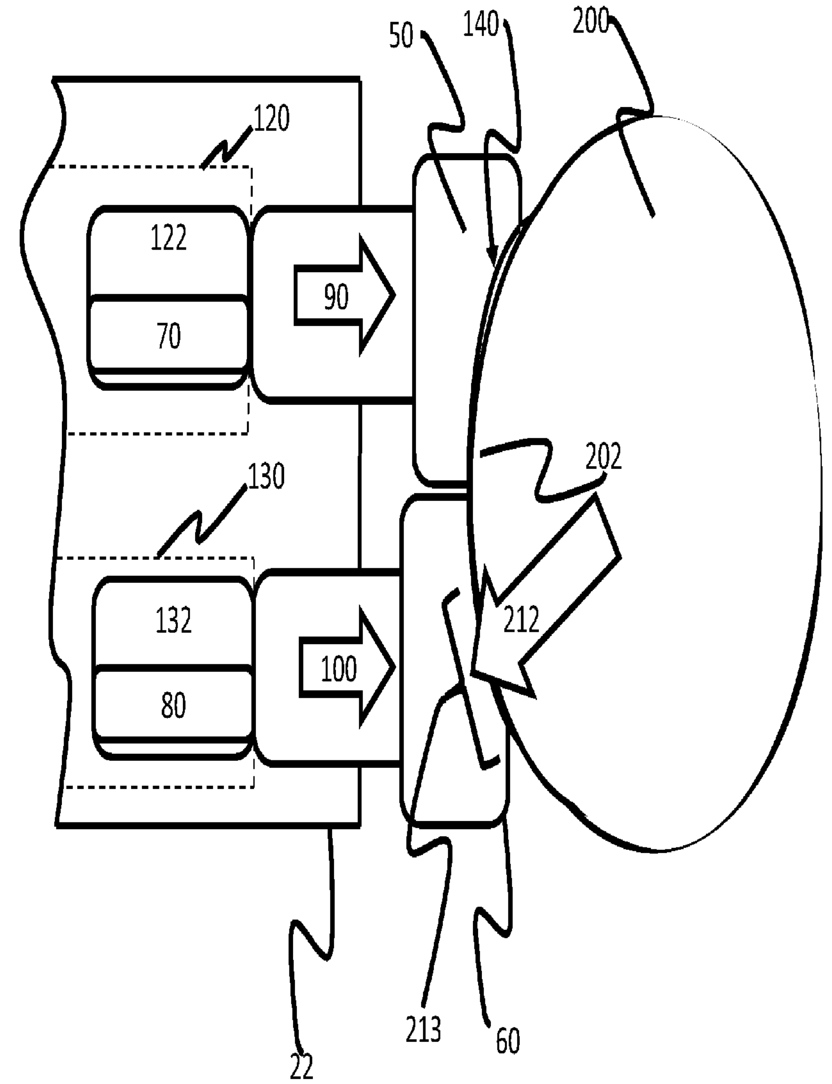
FIG. 11 illustrates a finger applying a force against a finger engagement surface to move a second engagement surface.
Figure 12:
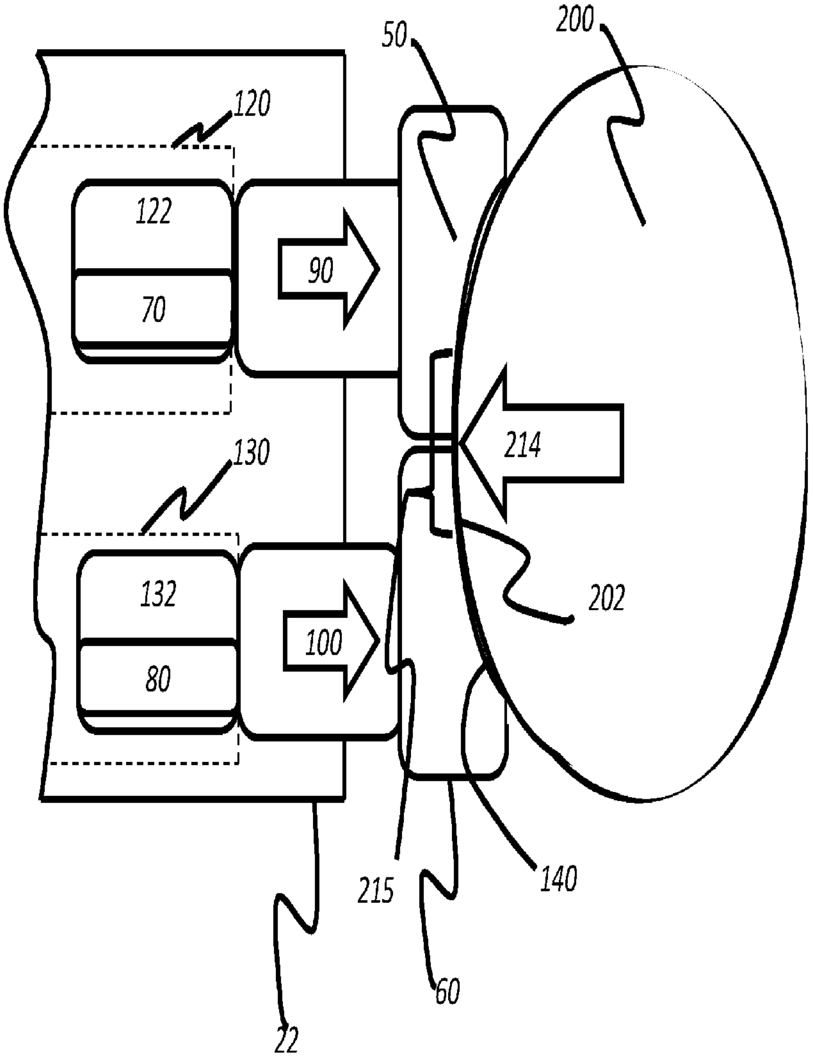
FIG. 12 illustrates a finger applying a force against a finger engagement surface to move both first engagement surface and second engagement surface into respective second positions.

FIGS. 10, 11 and 12 illustrate non-limiting embodiments of ways in which selections of modes of operation of electronic device 20 can be made using first contact member 50 and second contact member 60.

As is shown in FIG. 10 fingertip 202 may apply a first force 210 against a first portion 211 of finger engagement surface 140 in a manner that overcomes the urging of biasing force 90 and moves first contact member 50 to an extent that is sufficient to be detected by first input sensor 122 of first input sensing circuit 120 without substantially moving second contact member 60.

As is shown in FIG. 11, fingertip 202 alternatively may also apply a second force 212 against a second portion 213 of finger engagement surface 140 that is sufficient to overcome bias 100 and move that second contact member 60 in a manner that can be detected by second input sensor 132 of second input sensing circuit 130 without substantially moving first contact member 50.

As is shown in FIGS. 10 and 11, fingertip 202 applies forces 210 and 212 along vectors that are not parallel with a direction of movement of first contact member 50 and second contact member 60. Electronic device 20 is configured so that forces 210 and 212 are directed to be usable to drive movement in directions that are generally parallel to bias forces 90 and 100 such that bias forces 90 and 100 may be overcome and movement of first contact member 50 and second contact member 60 can be sensed.

In embodiments, a shape of finger engagement surface 140, in first portion 211 and in second portion 213 can be adapted to help convert or translate forces 210 and 212 applied thereto into forces in that are applied in appropriate directions to overcome bias forces 90 and 100.

In one example of this type, shown in FIGS. 10 and 11, first portion 211 of finger engagement surface 140 is sloped so as to help capture, convert or redirect enough of a first force 210 in a direction that can allow detectable movement of first contact member 50, similarly second portion 213 of finger engagement surface 140 is sloped so as to help capture, convert or redirect enough of a second force 212 in a direction that can allow detectable movement of second contact member 60.

Using this arrangement, finger 200 and fingertip 202 may remain in generally the same place with generally the same orientation but apply first force 210 along one vector and second force 212 along a second, different, vector and as shown here against different portions of finger engagement surface 140 to move either first contact member 50 or second contact member 60.

As is shown in FIG. 12, a user also has a third option when finger 200 and fingertip 202 are positioned against finger engagement surface 140 in that finger 200 and fingertip 202 can apply a third force 214 against a third portion 215 of finger engagement surface to urge both of first contact member 50 and second contact member 60 to move in a manner that can be detected by first input sensing circuit 120 and second input sensing circuit 130.

In embodiments, the shape of finger engagement surface 140 in third portion 215 can be adapted to help capture, convert or redirect a third force applied thereto to forces along directions that enable detectable movement of both first contact member 50 and second contact member 60.

In the embodiment of FIGS. 10-12 a third force 214 may be applied along an axis that is generally parallel to a direction of detectable movement of first contact member 50 and second contact member 60. Accordingly, in this embodiment, third portion 215 of finger engagement surface 140 has a portion on first contact member 50 shaped to capture a portion of third force 214 applied along this direction with the captured portion being sufficient to create detectable movement of first contact member 50 in this direction. Similarly in this embodiment, third portion 215 of finger engagement surface 140 has a portion on second contact member 60 shaped to capture a portion of third force 214 applied along this direction with the captured portion being sufficient to create detectable movement of second contact member 60.

In embodiments, either or both of first contact member 50 and second contact member 60 may be arranged to move between their respective first positions and their respective second position along paths that follow expected vectors along which first force 210 and second force 212 will be applied.

In embodiments, first contact member 50 may be mechanically associated with housing 22 so that movement of first contact member 50 from its first position to a second position separates or increases an extent of a separation of first contact member 50 from second contact member 60. This can be done so as to reduce the risk that application of first force 210 will bring fingertip 202 into inadvertent contact with second contact member 60 to an extent that is sufficient to move second contact member 60 to its second position.

Optionally or additionally, second contact member 60 may be mechanically associated with housing 22 so that movement of second contact member 60 separates or increases an extent of a separation of second contact member 60 from first contact member 50.

In one non-limiting example of such an embodiment, first contact member 50, second contact member 60 and housing 22 may cooperate so that first contact member 50 moves relative to housing 22 along a path that approximates a path of an expected vector of first force 210 and so that second contact member 60 moves relative to housing 22 along a path that that approximates an expected vector of force such as second force 212.

In operation, control system 110 determines an output of electronic device 20 based upon detected movement of at least one of first contact member 50 and second contact member 60.

In embodiments, sensors 122 and 132 can take the form of mechanical switches that optionally incorporate biasing members 70 and 80 into a first position. This bias further urges contact members 50 and 60, in a direction outward from the interior of housing 22. Sensors 122 and 132 have an initial state when contact members 50 and 60 are biased in this manner. However, when a user applies force against contact members 50 and 60 that is sufficient to move one of contact members 50 and 60 a respective one of sensors 122 and 132 may be urged into a second state or otherwise generate signal indicative of the sensed movement.

Sensors 122 and 132 can comprise any form of transducer or other device, material, or senor s capable of sensing movement created as the proximate result of force applied against contact members 50 and 60 and that can provide signals that can be used by controller 112 in a way that controller 112 or that can be used by any other portion of output such as an operating mode. Sensors 122 and 132 may take on other known mechanical, electrical, electro-mechanical, electro-optical and other forms of sensors including but not limited to piezoelectric sensors, Hall-effect or magnetic sensors, strain sensors, stress sensors, electrostatic sensors, pneumatic sensors, and optical sensors.

In embodiments, it is not necessary that any of contact members 50 and 60 move relative to housing 22 other than as necessary to enable reliable sensing thereof. In this regard, any application of force causing any degree of movement of contact members 50 and 60 that can be sensed can be used. Such movement may constitute visible movement of or translation of contact members 50 and 60 or it may constitute generally imperceptible movement.

Alternatively, such movement may be virtually imperceptible such as that which occasions an imperceptible movement such as that sufficient to create a detectable change in stress or strain within a contact members 50 and 60. In embodiments movement of contact members 50 and 60 may comprise movement made in response to changes in pressures, stress, or strain that cause slight or imperceptible movement.

In embodiments, a portion of one of contact members 50 and 60 may move by change of shape, size or orientation or by otherwise reacting to compression, tension, torsion, shear, stress, strain and other known responses of materials, articles, or structures to applied forces. In embodiments, biasing members 70 and 80 may comprise contact members 50 and 60 such as where contact members 50 and 60 are formed from materials that resist forces applied by a finger of a user.

In embodiments any of contact members 50 and 60 may be formed from materials or structures that integrate functions of sensors 122 and 132 or components thereof. Without limitation, contact members 50 and 60 may be formed using a material that changes electro-magnetic properties or the interaction of the material an electromagnetic field when a force is applied thereto. For example, materials that change resistance or that generate electricity when subject to stress or strain can be used to perform the functions of the respective one of the contact members 50 and 60 and one of sensors 122 and 132 if connected to control system 110.

In embodiments, finger engagement surface 140 can be shaped in shapes other than shown in FIGS. 1-12. For example and without limitation, patterns of raised and lowered areas can be provided provide liquids or contaminants a path away from finger engagement surface 140 or to otherwise increase a grip or extent of contact with finger engagement surface 140. Similarly, it is not necessary that portions of finger engagement surface 140 supplied by first contact member 50 and second contact member 60 be equally or generally equally distributed between first contact member 50 and first contact member 50 and second contact member 60 or to have generally symmetrical arrangements across a separation between contact members 50 and 60.

In embodiments movement of contact members 50 and 60 may be in directions that do not involve changing an extent to which contact members 50 and 60 extend into or out of housing 22.

Figure 13A:
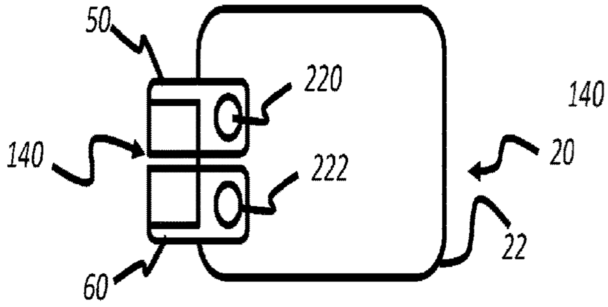
FIG. 13A illustrates an electronic device having contact members that rotate relative to a housing and with the contact members being in a first position.
Figure 13B:
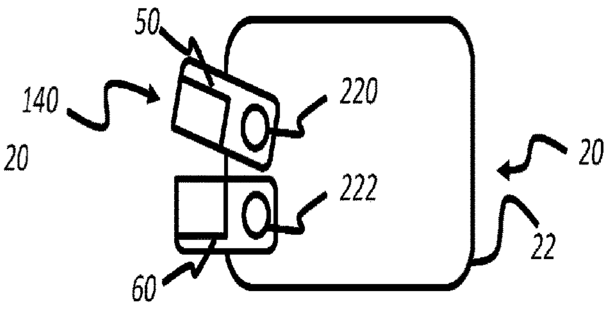
FIG. 13B illustrates the electronic device of FIG. 13A with a first contact member in a second position.

In one non-limiting example, FIGS. 13A-13D illustrate an electronic device 20 having first contact member 50 arranged to pivot about a pivot point 220 or otherwise rotate from a first position proximate to first contact member 50 into a second position that is less proximate to second contact member 60 such as the position that is illustrated in FIG. 13B.

Figure 13C:
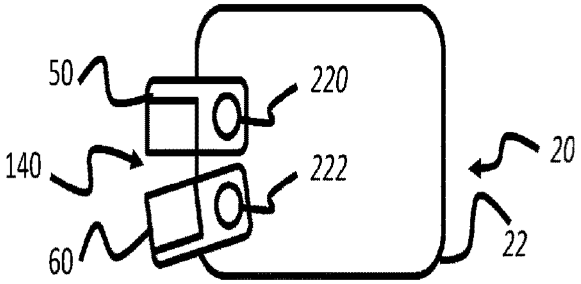
FIG. 13C illustrates the electronic device of FIG. 13A with a second contact member in a second position.

Similarly, second contact member 60 is arranged to pivot about a pivot point 222 or to otherwise rotate from a first position proximate to first contact member 50 into a second position that is less proximate to first contact member 50 such as the position that is illustrated in FIG. 13C.

Figure 13D:
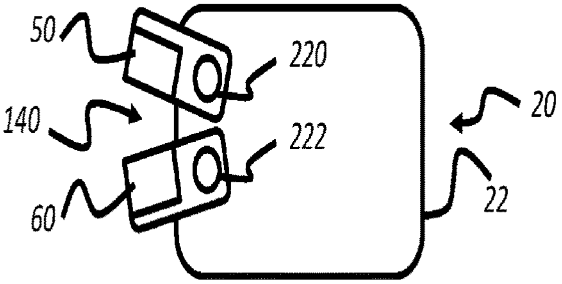
FIG. 13D illustrates the electronic device of FIG. 13A with a first contact member and second contact member in their second positions.

Here too, first contact member 50 and second contact member 60 may be biased into their respective first positions and finger engagement surface 140 can be defined so that application of force at a portion of finger engagement surface 140 which can for example be generally between first contact member 50 and second contact member 60 will drive both first contact member 50 and second contact member 60 to their second positions as is illustrated in FIG. 13D.

Figure 14A:
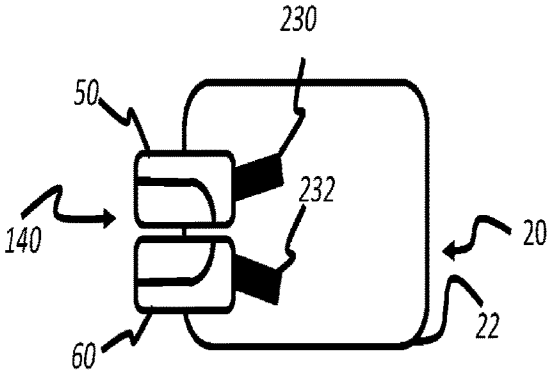
FIG. 14A illustrates an electronic device having contact members that slide relative housing and with the contact members in a first position.
Figure 14B:
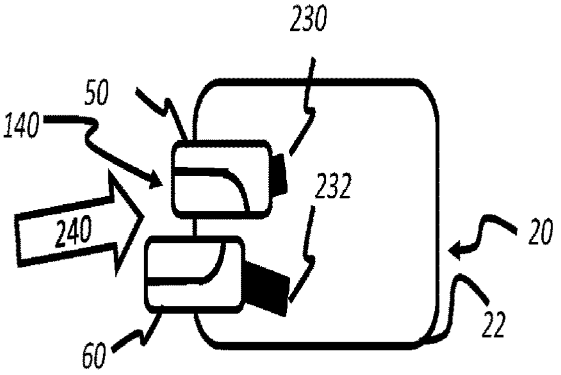
FIG. 14B illustrates the electronic device of FIG. 14A with a first contact member in a second position.

In another non-limiting example, FIGS. 14A-14D illustrate an electronic device 20 having a housing 22 and first contact member 50 that are configured so that, in response to application of a force such as force 240, first contact member 50 can slide along a first slide path 230 or to otherwise move in a generally linear direction along housing 22 between a first position shown in FIG. 14A proximate to second contact member 60 into a second position that is less proximate to second contact member 60 such as the position that is illustrated in FIG. 14B.

Figure 14C:
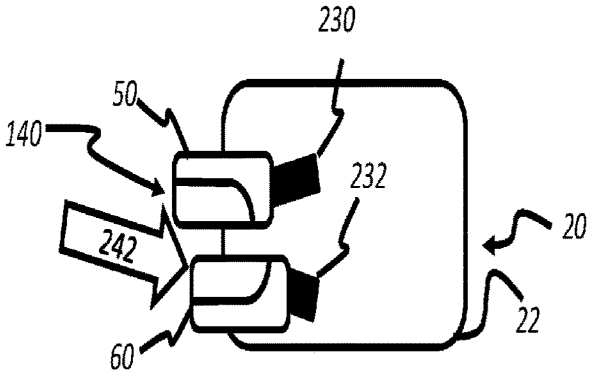
FIG. 14C illustrates the electronic device of FIG. 14A with a second contact member in a second position.

Similarly, in this embodiment second contact member 60 and housing 22 are configured so that, in response to a force such as force 242, second contact member 60 can slide along a second slide path 232 or to otherwise move in a generally linear direction along housing 22 between a first position shown in FIG. 14A proximate to first contact member 50 into a second position that is less proximate to first contact member 50 such as the position as is illustrated in FIG. 14C.

Figure 14D:
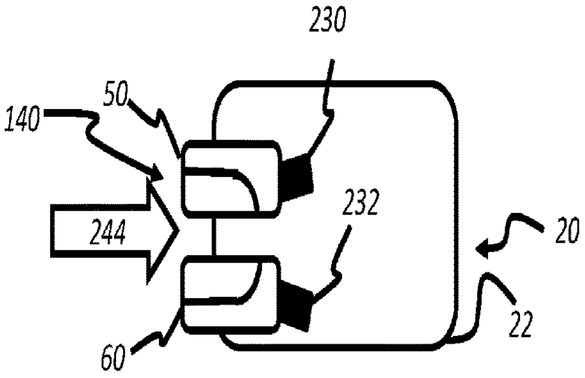
FIG. 14D illustrates the electronic device of FIG. 14A with a first contact member and second contact member in their second positions.

Additionally, finger engagement surface 140 may be defined so that application of a force such as force 244 generally between first contact member 50 and second contact member 60 will drive both first contact member 50 and second contact member 60 to their second positions as is illustrated generally in FIG. 14D.

Figure 15:
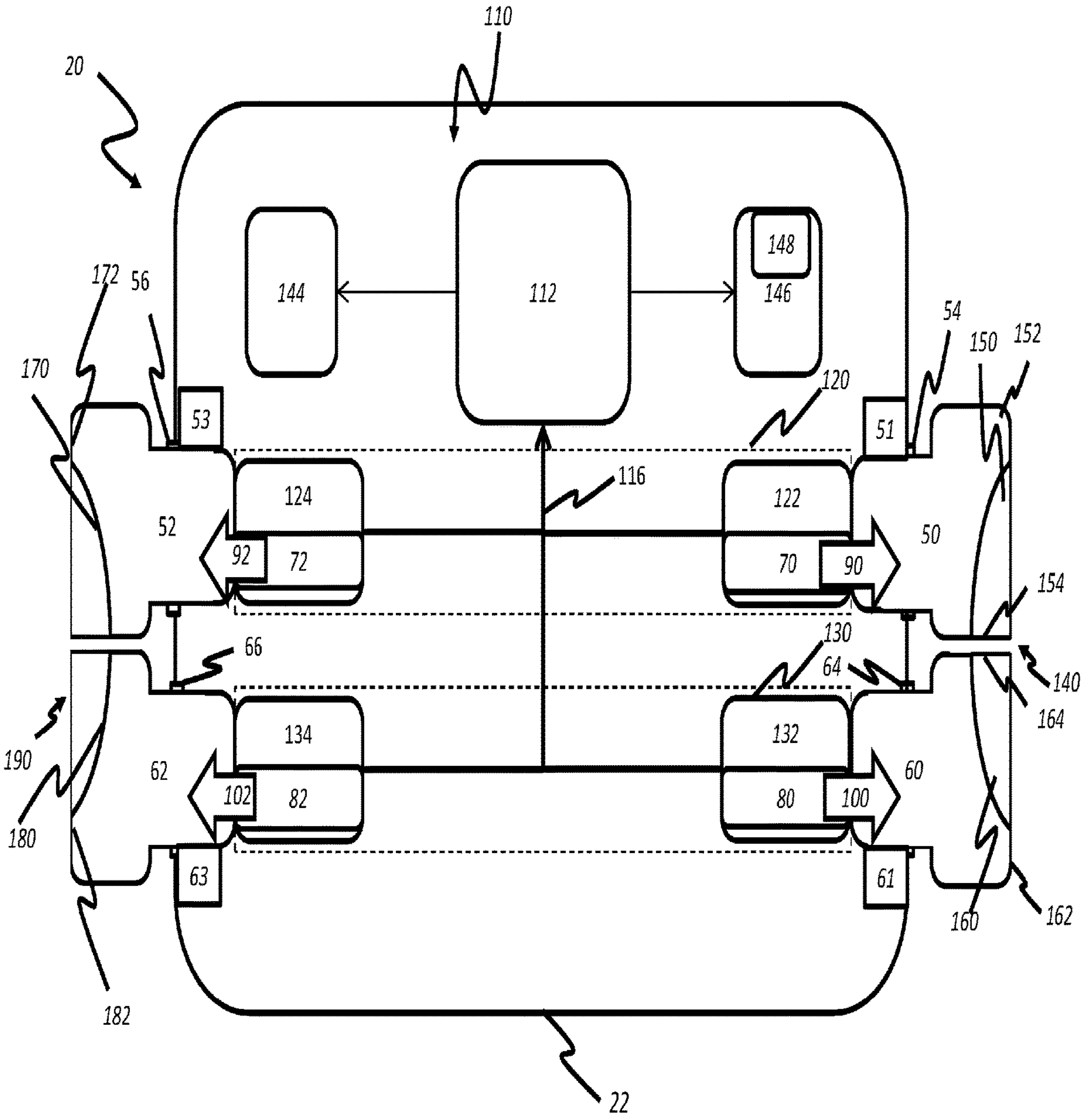
FIG. 15 shows another embodiment of an electronic device having an additional first contact member and an additional second contact member arranged to enable ambidextrous operation of the electronic device.

FIG. 15 shows another embodiment of an electronic device 20 having an additional first contact member 52 and an additional second contact member 62.

In this embodiment, additional contact members 52 and 62 extend partially within openings 56 and 66 of housing 22 for sliding movement between a first position and a second position. Here, the first positions are defined by stops 53 and 63 which limit an extent to which additional first contact member 52 and additional second contact member 60 can extend from housing 22.

In embodiments, additional first contact member 52, additional second contact member 62, housing 22 or other components of electronic device 20 can be defined in other ways so that at least a portion of each of additional first contact member 52 and additional second contact member 62 is retained within housing 22 or otherwise mechanically associated with housing 22 and an additional finger engagement surface 190 is formed in part by additional first contact member 52 and in part by additional second contact member 62.

In the embodiment shown in FIG. 15 biasing member 72 applies a biasing force 92 that urges additional first contact member 52 away from an interior of housing 22 and into its first position. Similarly, biasing member 82 applies a biasing force 102 that urges additional second contact member 60 away from an interior of housing 22 and into its first position. Accordingly, additional contact members 52 and 62 may be urged by forces greater than biasing forces 92 and 102 to cause additional contact members 52 and 62 to move from their respective first positions.

Additional first contact member 52 and additional second contact member 62 have an additional first finger receiving surface 170 and an additional second finger receiving surface 180 that form, in combination an additional finger engagement surface 190 and optionally include ridges 172 and 182. Such aspects of additional contact members 52 and 62 may have characteristics and be operable in manners that are similar to the characteristics and operations described above and that are otherwise consistent with the features and operations of first contact member 50 and second contact member 60.

As is shown in FIG. 15, a first sensing system 120 may include an additional first sensor 124 arranged to sense movement of additional first contact member 52 and second sensing system 130 includes an additional second sensor 134 arranged to sense movement of additional second contact member 62.

In other embodiments electronic device 20 may be arranged so that a single sensor such as first sensor 122 can detect movement of both first contact member 50 and additional first contact member 52 or so that second sensor 132 can detect movement of both second contact member 60 and additional second contact member 62. In non-limiting examples of this type a first sensor 122 can be positioned at a location where first sensor 122 can sense movement of first contact member 50 and additional first contact member 52 or a linkage can be positioned between first contact member 50 and additional first contact member 52 so that first contact member 50 and additional contact member 52 function together. Optionally a linkage can be used so that movement of either first contact member 50 or additional first contact member 52 can be sensed by a single first sensor 122. Such a linkage can also be used with respect to second contact member 60 and additional second contact member 62.

In this embodiment, first contact member 50 and second contact member 60 are positioned on opposite sides of housing 22 from additional first contact member 52 and additional second contact member 62. Control system 110 may react to sensed movement of additional first contact member 52 and additional second contact member 62 in a manner similar to that described above when movement of first contact member 50 or second contact member 60 is sensed so as to provide ambidextrous operation of electronic device 20.

For example, control system 110 may be adapted to cause an output of the electronic device 20 to change in a first manner when control system 110 senses conditions indicating that one of first contact member 50 or additional first contact member 52 has moved while also being to adapted to cause an output of the electronic device 20 to change in a second manner when control system 110 senses conditions indicating that one of the second contact member 60 or additional second contact member 62 has moved. Here too, control system 110 may be adapted to cause an output of electronic device 20 to change in a third manner when control system 110 senses conditions indicating that first contact member and the second contact member 60 have moved at about the same time or that the additional first contact member 52 and the additional second contact member 62 have moved at about the same time. However, in other embodiments control system 110 may react to sensed motion of additional first contact member 52 and additional second contact member 62 in different ways.

Further, in other embodiments, other arrangements of additional contact members 52 and 62 can be used. For example, additional contact members 52 and 62 may be arranged on a same surface of housing 22 as contact members 50 and 60, or on other non-oppositional surfaces.

Additionally, in embodiments, it may be beneficial for first contact member 50 and second contact member 60 to operate with different types of motion or directions of actuation than additional first contact member 52 and additional second contact member 62. In one non-limiting example of this, first contact member 50 and second contact member 60 may operate as illustrated in the embodiment of FIGS. 13A-13D while additional first contact member 52 and additional second contact member 62 may operate as is illustrate in the embodiments of FIGS. 14A-14D.

It will also be understood that as illustrated herein electronic device 20 has been shown as a device that is separate from deterrent device 10 and that is joined thereto. However, in embodiments electronic device 20 may be incorporated into deterrent device 10 as a module or otherwise incorporated into deterrent device 10. In embodiments, housing 22 may comprise a component of deterrent device 10 such as a grip, handle, chassis, foregrip, slide, barrel, rail or any other component or components of a deterrent device such as a firearm, or deterrent device as well as any other device that may be directed by a user gripping or grasping a grip or portion thereof.

It will be appreciated that that in embodiments, deterrent device 10 may take the form of a simulated deterrent device such as a weapon shaped training device, or devices that distribute paint or pepper balls, air soft munitions, pneumatic or other pressurized air projectile launching devices, optical beam emitters, and electromagnetic, fluidic and sonic emitters and models and simulators thereof.

In embodiments, a communication link 116 between first sensing system 120 and controller 112 and between second sensing system 130 and controller 112 may be made by way of a direct connection or by way of wireless signals sent from an optical, electrical or other signals transmitted between controller 112 and first sensing system 120 and signals transmitted between controller 112 and second sensing system 130.

In embodiments such wireless signals may be sent and received using for example and without limitation, active or passive radio frequency transponders incorporating or operatively associated with first sensing system 120 or second sensing system 130. In one embodiment, first sensor 122 and second sensor 132 may take the form of a sensor associated with a radio frequency transponder that polls Similarly transmitters and receivers using other forms of radio frequency, optical or other technology may be used including but not limited to those that conform to known wireless communication standards and specifications such as those promulgated by the ZigBee Alliance, Davis, CA, USA, those promulgated by the Institute of Electrical and Electronics Engineers, New York, NY, USA, including but not limited to those promulgated under I.E.E.E. Standard 802.1 and those promulgated or maintained by the Bluetooth Special Interest Group, Kirkland Washington.

While the present invention has been particularly shown and described with references to preferred embodiments thereof, it will be understood by those skilled in the art that various changes in form and details may be made therein without departing from the spirit and scope of the invention as defined by the appended claims.

What is claimed is:

1. A deterrent device comprising:

a firearm frame;

a housing releasably coupled to the firearm frame;

a finger engagement surface shaped to receive a portion of a finger and formed in part by a first contact member movably associated with the housing and in part by a second contact member movably associated with the housing, wherein the first contact member and the second contact member are independently actuatable; and an electronic device having a control system adapted to sense when the first contact member is moved and to sense when the second contact member is moved and that determines an output of the electronic device by sensing movement of at least one of the first contact member and the second contact member;

wherein:

the first contact member is configured so that the portion of the finger moves the first contact member in a manner that can be sensed, the second contact member is configured so that a second part of the finger moves the second contact member in a manner that can be sensed, and the finger engagement surface is configured so that a third portion of the finger moves both the first contact member in a manner that can be sensed and the second contact member in a manner that can be sensed.

2. The deterrent device of claim 1, wherein at least one of the first contact member or the second contact member is shaped in part to guide the portion of the finger into contact with the finger engagement surface.

3. The deterrent device of claim 1, wherein the finger engagement surface is shaped to guide a finger positioned against the finger engagement surface to a position that is within a predetermined range of positions relative to the first contact member and the second contact member.

4. The deterrent device of claim 1, wherein:

the first contact member is shaped to provide a first tactile experience when a portion of a finger is in contact with a portion of the first contact member that is not a part of the finger engagement surface; and the second contact member is shaped to provide a second tactile experience when a portion of a finger is in contact with a portion of the second contact member that is not a part of the finger engagement surface, the first tactile experience being different from the second tactile experience.

5. The deterrent device of claim 1, wherein a portion of the finger engagement surface on the second contact member is shaped so that movement of the received portion of the finger toward the second contact member can move the second contact member without moving the first contact member in the manner that can be sensed.

6. The deterrent device of claim 1, further comprising an additional first contact member and an additional second contact member movably associated with the housing, and wherein the control system is further adapted to cause the output of the electronic device based at least in part on at least one of the first contact member or the additional first contact member being moved.

7. The deterrent device of claim 1, wherein the deterrent device comprises at least one of a simulated deterrent device, a weapon shaped training device, a device that distributes paint balls, a device that distributes pepper balls, a device that distributes air soft munitions, a pneumatic projectile launching device, a pressurized gas projectile launching device, an optical beam emitting device, an electromagnetic emitting device, a fluidic emitting device, or a sonic emitting device.

* * * * *